United States Patent Office 3,444,754
Patented May 20, 1969

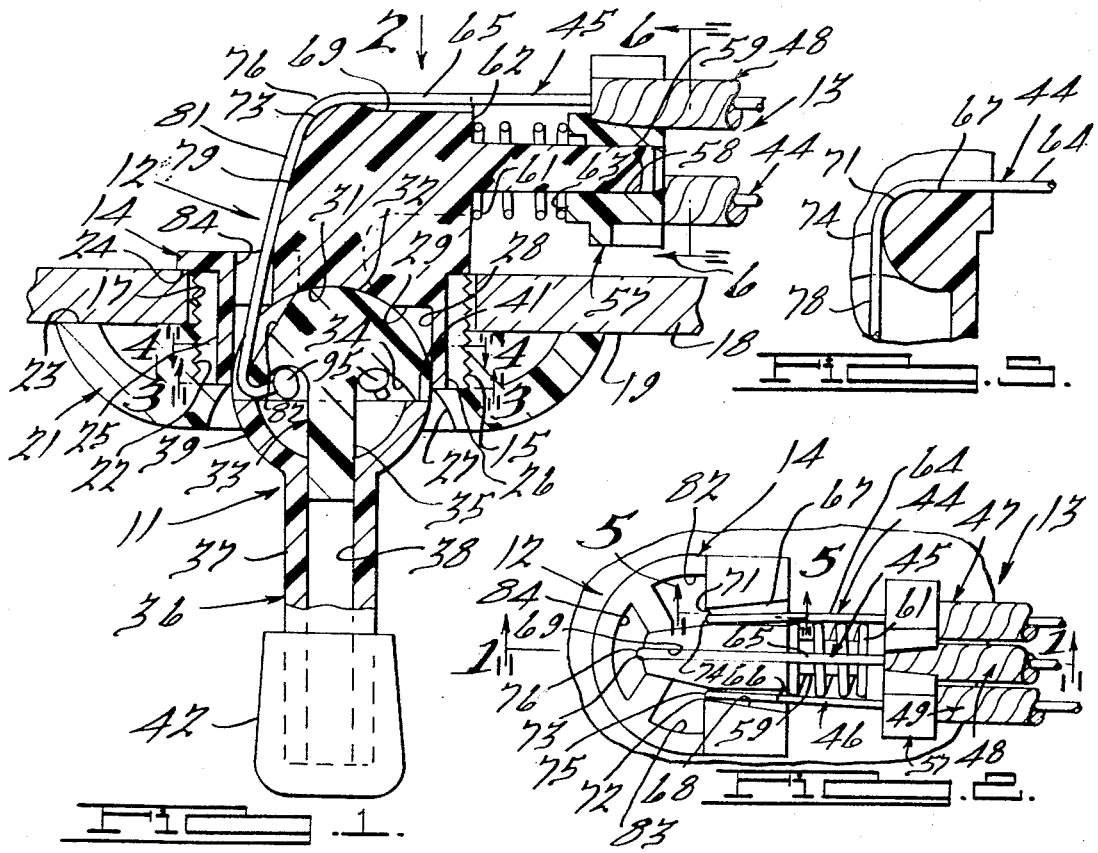
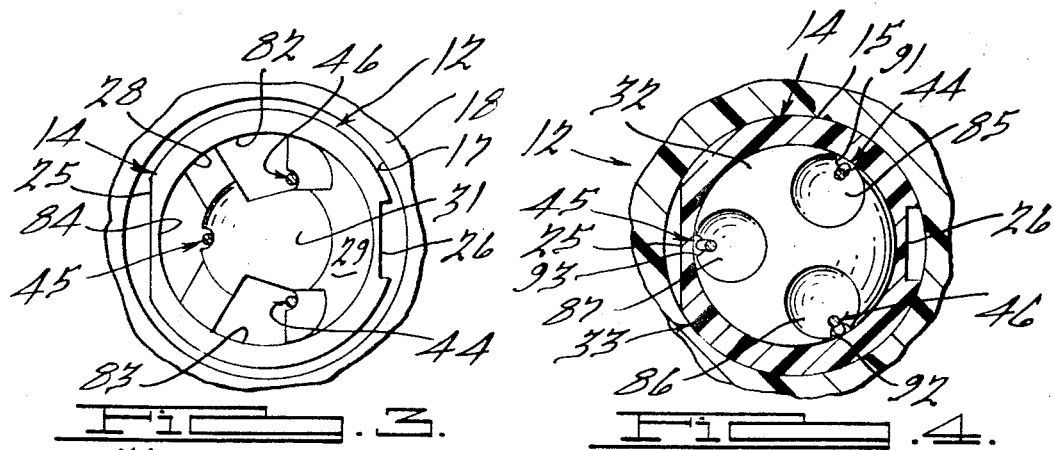
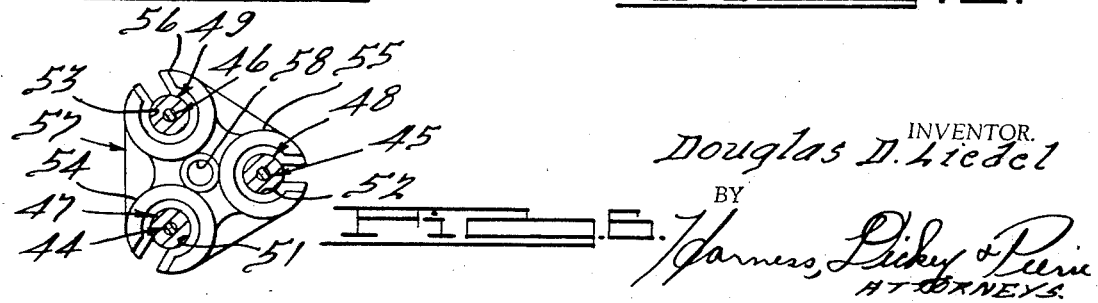

3,444,754
REMOTE CONTROLLED MOTION
TRANSMITTING DEVICE
Douglas D. Liedel, Belleville, Mich., assignor to C. M.
Hall Lamp Company, a corporation of Michigan
Filed Apr. 7, 1967, Ser. No. 629,150
Int. Cl. F16c 1/18
U.S. Cl. 74—501                                    10 Claims

ABSTRACT OF THE DISCLOSURE

A remote controlled device and particularly a control actuator for a remote controlled automotive rear view mirror. The control actuator comprises a combined supporting and guide member that supports a control lever for universal pivotal movement. In addition, the guide member provides arcuate surfaces across which wire actuators extend for establishing an angular relationship between portions of the wire actuators. One end of each of the wire actuators is connected to the control lever and the other end of each actuator is connected to a remotely located rear view mirror so that the position of the mirror may be adjusted by pivotal movement of the control lever. Protective sheaths encircle each of the wire actuators and the respective ends of these sheaths terminate short of the guide surfaces so that only the wire actuators need be bent across the guide surfaces.

Background of the invention

This invention relates to a remote control actuator and more particularly to a remote control actuator employing flexible transmitters and a structure for establishing an angular relationship between portions of each of the actuators.

One common form of remote control device that embodies wire actuators for transmitting control movement is a remote control, outside rear view mirror of a motor vehicle. Rear view mirrors of this type are comprised of a mirror that is pivotally supported on the exterior sheet metal of the motor vehicle, most commonly upon the driver's door, a control lever supported within the passenger compartment and a plurality of flexible transmitters that interconnect the control lever with the mirror. The aforenoted components are normally supplied as a preassembled, preadjusted unit that is installed either on the automotive assembly line or by garages. In installation, the control lever and the associated wire actuators are threaded through openings in the body sheet metal with the associated control lever being finally exposed on the inside door panel of the vehicle. Because the interior of the door contains the latch mechanism for the door and one or more windows and the associated operating mechanism for these windows, the installation normally requires the location of the flexible transmitters in a position that will not interfere with the operation of these other internally located mechanisms. This necessitates several acute angle bends in each of the flexible transmitters. The location and number of these bends as well as their degree of severity may vary even on a given type of vehicle due to different installation techniques. Such variations can and frequently do affect the preadjusted relationship of the parts and render a given installation unsuitable. One of the more severe bends occurs adjacent the inner face of the door panel upon which the control lever is supported. In almost all installations, a 90° bend in each of the flexible transmitters is required at this point. At each of these bends, the preadjustment is disturbed if both the wire actuator and its protective sheath must be bent. In such instances, the bending of both the sheath and the contained wire actuator results in a foreshortening of the wire actuator.

It is, therefore, a principal object of this invention to provide a remote control actuator that simplifies installation techniques.

It is another object of this invention to provide a remote control actuator embodying an improved structure for establishing an angular relationship between portions of the actuator.

It is a further object of this invention to provide an improved remote control rear view mirror for a motor vehicle.

It is yet another object of this invention to provide a remote control actuator embodying a guide structure for establishing a predetermined angular relationship between portions of the wire actuator.

Summary of the disclosure

A remote control actuator embodying this invention is particularly adapted for transmitting motion between a pair of spaced devices and around a substantial angle. The actuator comprises a flexible wire actuator adapted to be connected at its opposite ends to respective of the spaced device. A protective sheath encircles at least a portion of the length of the wire actuator and supports the contained portion of the wire actuator for reciprocation. A guide member is provided to establish an angular relationship between adjacent portions of the wire actuator. This guide member defines an arcuate guide surface across which an intermediate portion of the wire actuator extends. This intermediate portion of the wire actuator connects first and second angularly disposed portions and the protective sheath encircles only one of these portions and terminates at a point spaced from the guide surface.

Brief description of the drawings

FIGURE 1 is a cross-sectional view of a portion of a remote control automotive rear view mirror embodying this invention and taken in a horizontal plane.

FIGURE 2 is an elevational view taken in the direction of the arrow 2 in FIGURE 1. The line 1—1 in this view indicates the plane along which FIGURE 1 is taken.

FIGURE 3 is a cross-sectional view taken along the line 3—3 of FIGURE 1 with the control lever removed to more clearly show the details of the construction.

FIGURE 4 is a cross-sectional view taken along the line 4—4 of FIGURE 1.

FIGURE 5 is a cross-sectional view taken along the line 5—5 of FIGURE 2.

FIGURE 6 is a cross-sectional view taken along the line 6—6 of FIGURE 1.

Detailed description of the preferred embodiment

This invention has been disclosed as being used in connection with a remote control outside rear view mirror of a motor vehicle. It is to be understood, however, that certain of the inventive features may be used in connection with other types of remote control mechanisms that embody flexible transmitters. The remote control actuator is comprised of a control lever assembly 11 that is supported for pivotal movement by a supporting assembly, indicated generally by the reference numeral 12. A flexible transmitter assembly 13 interconnects the control lever assembly 11 with a remotely positioned rear view mirror (not shown). As will become more apparent as this description proceeds, the connection of the flexible transmitter assembly 13 to the mirror may be of any known type and for this reason has not been shown in the drawings.

The supporting assembly 12 is comprised of a combined supporting and guide member, indicated generally by the reference numeral 14. The combined member 14 is provided with a generally cylindrical male threaded portion 15 that is adapted to project through a complementary aperture 17 formed in a door panel 18. The door panel 18 has an outer surface 19 that is adjacent the passenger compartment of the associated motor vehicle. A bezel member 21 is formed with a female threaded opening 22 that is threaded onto the threaded portion 15 of the combined member 14. The bezel member 21 defines an inwardly facing shoulder 23 that abuttingly engages the door panel face 19 and which maintains a shoulder 24 of the combined member 14 in engagement with the opposite surface of the panel 18 thus fixing the supporting assembly 12 with respect to the panel 18. If desired, a washer (not shown) may be interposed between the shoulder 24 and the adjacent face of the door panel 18. Preferably, this washer will have an opening complementary in shape to the portion 15 and will have a surface in engagement with a flattened surface 25 (FIGURE 4) of the portion 15 and a tang that engages an axially extending groove 26 formed in the portion 15.

The bezel member 21 is formed with a central opening 27 that is aligned with a cylindrical opening 28 formed in the combined member portion 15. The opening 28 is closed at one end by an integral wall 29 that defines a socket cavity 31 at its center. The socket cavity 31 is preferably in the shape of a segment of a sphere. A complementary surface 32 of a control lever 33 is held in bearing relationship with the socket cavity 31 so as to support the control lever 33 for universal pivotal movement with respect to the support assembly 12.

The control lever 33 is formed with a cavity 34 in its outer face which cavity has the shape of a segment of a torus defines an outwardly extending projection 35. A control handle, indicated generally by the reference numeral 36, has a shank portion 37 that defines a cylindrical opening 38 that is complementary to the projection 35 and is received thereon with a snap or press fit. The shank 37 terminates in an outwardly flared portion 39 which has the shape of a segment of a thin wall sphere of substantially the same radius as the surface 32. The portion 39 terminates in an inwardly facing shoulder 41 that is engaged with the outer periphery of the control lever 33. A knob 42 or other suitable member is affixed to the outer end of the shank 37 to complete the control lever assembly 11.

The flexible transmitter assembly 13 is comprised of three wire actuators 44, 45 and 46. As is well known, each of the wire actuators 44, 45 and 46 is a flexible, substantially incompressible wire. Each of the wire actuators 44, 45 and 46 is encircled along a major portion of its length by a respective protective sheath 47, 48 and 49. One end of each of the protective sheaths 47, 48 and 49 is received and clamped in a complementary cylindrical opening 51, 52 and 53 defined by a cylindrical projection 54, 55 and 56 of a retainer member, indicated generally by the reference numeral 57. The retainer member 57 is formed with a cylindrical opening 58 through which an integral pin-like projection 59 of the combined member 14 extends. The cooperation of the projection 59 with the opening 58 locates the retainer member 57 with respect to the supporting assembly 12. A coil spring 61 encircles the projection 58 and bears against a face 62 of the combined member 14 and against a face 63 of the retainer member 57. The spring 61 serves to maintain tension on the components and will permit some self-centering of the retainer member 57 with respect to the combined member 14. The retainer member 57 will be prevented from slipping off of the projection 59 by the connection of the sheaths 47, 48 and 49 to the associated mirror assembly (not shown).

The wire actuators 44, 45 and 46 each have respective first portions 64, 65 and 66 which are covered for a major portion of their length by the respective protective sheaths 47, 48 and 49 and which portions 64, 65 and 66 have exposed portions that extend beyond the retainer member 57 toward the combined member 14 in generally coaxial relationship to the unexposed portions. The combined member 14 is formed with grooves 67 and 68 in its rear face (FIGURES 2 and 5) across which the wire actuator portions 64 and 66 extend. A like groove 69 is formed in the combined member 14 between the grooves 67 and 68 for receipt of the wire portion 65. The grooves 67, 68 and 69 terminate adjacent arcuate guide portions 71, 72 and 73 across which second or intermediate portions 74, 75 and 76 of the wire actuators 44, 46 and 45, respectively, extend. The arcuate guide surface 71 continues in a re-entry manner on substantially the same radius back toward a direction that is parallel to the groove 67 (FIGURE 5). A third portion 78 of the wire actuator 44 extends across this continuation of the guide surface thus turning the wire actuator 44 through a substantial angle. A similar guide structure is provided for portions of the wire 46. This construction does not appear in the drawings but it may be considered to be identical to that shown in FIGURE 5.

The arcuate guide surface 73 terminates adjacent a generally straight guide surface 79 (FIGURE 1) across which a third portion 81 of the wire actuator 45 extends. The wire actuator portions 64 and 81 are also disposed at a substantial angle to each other as a result of the guide surfaces 73 and 79. In the depicted embodiment, this angle is somewhat less than the corresponding angle of the wire actuators 44 and 46.

Generally arcuate openings 82 and 83 are formed in the combined member 14 at the termination of the straight guide surfaces 77. A like opening 84 is formed adjacent the termination of the straight guide surface 79. The openings 82, 83 and 84 terminate in the wall 29 at circumferentially spaced locations with respect to the socket cavity 31 and adjacent the latter. The respective wire portions 78 of the wire actuators 44 and 46 pass through the openings 82 and 83 and the portion 81 of the wire actuator 45 extends through the opening 84. The control lever member 33 is formed with flattened surfaces 85, 86 and 87 around its surface 32 and across which the respective portions of the wire actuators 44, 46 and 45 extend. The flattened portions 85, 86 and 87 are juxtaposed to the respective openings 82, 83 and 84. The end of each wire actuator 44, 46 and 45 extends across an arcuate groove 91, 92 and 93 formed in the control lever member 33 and is fixed relative to the control lever member 33 in the cavity 34, by means of fasteners 95 of any known type.

It should be readily apparent that pivotal movement of the control lever assembly 11 will cause tensioning of certain of the wire actuators 44, 45 and 46 and compression of the other of these elements depending upon the direction of pivotal movement. The arcuate guide surfaces which have been described permits this motion to be transmitted through approximately a 90° angle without any substantial restriction to movement since the bent portion of the respective wire actuators is not enclosed by any protective sheath. The guiding of the wire actuators 44, 45 and 46 by the guide surfaces 71, 72 and 73 is further facilitated by forming the combined member 14 from a suitable plastic so as to reduce friction as the wire actuators pass across the respective guide surfaces. Certain of the other components such as the control lever assembly 11 and retainer member 57 may also be formed from plastic.

The motion of the control lever 11 is transmitted from the wire actuators 44, 45 and 46 to the remotely positioned mirror (not shown). The ends of the wire actuators 44, 45 and 46 may be connected to the mirror in any known manner, for example in the manner shown in my copending patent application entitled "Remote Controlled Mirror," Ser. No. 629,177, filed April 7, 1967, and assigned to the assignee of this invention. It is to be understood that other types of connections may be employed and that the device disclosed may be used to control other types of remotely positioned articles. The connection to the remotely positioned article should be such that the wire actuators 44, 45 and 46 are maintained under some tension so as to maintain the control lever surface 32 in contact with the socket cavity 31 of the combined member 14.

It should be readily apparent that the orientation of the structure described may be rotated through 90° or at any other angle depending upon the specific installation required. Some further bends may be required in the flexible transmitter assembly 13 upon installation. One of the more severe bends, however, is permanently established by the combined member 14 and its coaction with the wire actuators 44, 45 and 46. Thus, the preadjusted relationship of the overall assembly should not be disturbed significantly upon installation.

What is claimed is:

1. A remote control actuator for transmitting motion between a pair of spaced devices and around a substantial angle, said actuator comprising a plurality of flexible wire actuators each adapted to be connected at its opposite ends to a respective of the spaced devices, a plurality of protective sheaths each encircling at least a portion of the length of a respective one of said wire actuators and supporting the contained portion of the respective wire actuator for reciprocation, a guide member defining an arcuate guide surface for each of said wire actuators for establishing an angular relationship between adjacent portions of each of said wire actuators, each of said wire actuators having first and second angularly disposed portions interconnected by a portion in engagement with a respective of said guide surfaces, a retainer member, one end of each of said protective sheaths being affixed to said retainer member at a point spaced from the respective of said guide surfaces, and biasing means interposed between said guide member and said retainer member for urging said retainer member away from said guide member.

2. A remote control actuator for transmitting motion between a pair of spaced devices and around a substantial angle, said actuator comprising a plurality of flexible wire actuators each adapted to be connected at its opposite ends to a respective of the spaced devices, a plurality of protective sheaths each encircling at least a portion of the length of a respective one of said wire actuators and supporting the contained portion of the respective wire actuator for reciprocation, a guide member defining an arcuate guide surface for each of said wire actuators for establishing an angular relationship between adjacent portions of each of said wire actuators, each of said wire actuators having first and second angularly disposed portions interconnected by a portion in engagement with a respective of said guide surfaces, a retainer member, one end of each of said protective sheaths being affixed to said retainer member at a point spaced from the respective of said guide surfaces, and supporting means projecting from said guide member toward said retainer member, said retainer member being slidably supported upon said projecting supporting means.

3. A remote control actuator as set forth in claim 2 further including biasing spring means encircling the projecting supporting means and engaging the guide member and the retainer member for urging said members away from each other.

4. A remote control actuator for transmitting motion between a pair of spaced devices and around a substantial angle, said actuator comprising a guide member, said guide member defining a socket portion for supporting one of the devices for universal pivotal movement, means defining a plurality of spaced openings in said guide member adjacent said socket opening, a plurality of guide surfaces formed by said guide member, each of said guide surfaces being juxtaposed to a respective one of said openings and disposed at an angle thereto, a plurality of wire actuators, each of said wire actuators having a first end portion adapted to be connected to the one device, a first intermediate portion extending from said first end portion through a respective one of said openings in said guide member, a second intermediate portion extending from said first intermediate portion across a respective one of said guide surfaces of said guide member, a third intermediate portion extending from said second intermediate portion and disposed at a substantial angle to said first intermediate portion and a second end portion adapted to be connected to the other device, a plurality of protective sheaths, each of said protective sheaths encircling a major portion of the length of the third intermediate portion of a respective one of said wire actuators and guiding the contained part of said third intermediate portion for reciprocation, a retainer member juxaposed to said guide member and means affixing one end of each of said protective sheaths to said retainer member in spaced relationship from the respective guide surface of said guide member.

5. A remote control actuator as set forth in claim 4 wherein the one device comprises a control lever having a surface complementary to the guide member socket portion for supporting said control lever for pivotal movement with respect to said guide member and means for affixing the first end portion of each of the wire actuators to said control lever.

6. A remote control actuator as set forth in claim 4 wherein the guide member defines a cylindrical supporting projection, the retainer member having an opening complementary to and slidably supporting said retainer member upon said supporting projection.

7. A remote control actuator as set forth in claim 6 further including biasing spring means encircling the supporting projection and engaging the guide member and the retainer member for urging said members away from each other.

8. A remote control actuator for transmitting motion to a remotely controlled device and around a substantial angle, said actuator comprising a supporting assembly, a control member, means on said control member and on said supporting assembly defining a ball and socket connection for pivotally supporting said control member upon said supporting assembly for universal pivotal movement about a point, a plurality of guide surfaces formed by said supporting assembly at spaced locations, a plurality of wire actuators, each of said wire actuators having a first end portion connected to said control member, said wire actuators being connected to said control member at circumferentially spaced positions about said point, said wire actuators further having a first intermediate portion extending from said first end portion toward a respective one of said guide surfaces, a second intermediate portion extending from said first intermediate portion across the respective one of said guide surfaces, a third intermediate portion extending from said second intermediate portion and disposed at a substantial angle to said first intermediate portion and a second end portion adapted to be connected to the remotely controlled device, a plurality of protective sheaths, each of said protective sheaths encircling a major portion of the length of the third intermediate portion of a respective one of said wire actuators and guiding the contained part of said third intermediate portion for reciprocation, said supporting assembly further providing means for fixing one end of each of said protective sheaths thereto in spaced relationship from the respective guide surface.

9. A remote control actuator as set forth in claim 8 wherein the supporting assembly further includes biasing spring means operatively interposed between said control member and the one end of the protective sheaths for applying a tension upon said actuator.

10. A remote control actuator as set forth in claim 8 wherein the third portions of the wire actuators are substantially parallel to each other.

References Cited

UNITED STATES PATENTS

| | | | |
|---|---|---|---|
| 3,094,582 | 6/1963 | Jacobson | 74—501 |
| 3,286,545 | 11/1966 | Malachowski | 74—501 |
| 3,365,978 | 1/1968 | Kirby et al. | 74—501 |

FRED C. MATTERN, JR., *Primary Examiner.*

MANUEL ANTONAKAS, *Assistant Examiner.*